United States Patent
Ikushima

(10) Patent No.: US 10,508,668 B2
(45) Date of Patent: Dec. 17, 2019

(54) PIPE-CONNECTING CLAMP

(71) Applicant: MUSASHI ENGINEERING, INC., Mitaka-shi, Tokyo (JP)

(72) Inventor: Kazumasa Ikushima, Mitaka (JP)

(73) Assignee: MUSASHI ENGINEERING, INC., Tokyo (JP)

(*) Notice: Subject to any disclaimer, the term of this patent is extended or adjusted under 35 U.S.C. 154(b) by 1120 days.

(21) Appl. No.: 14/364,390

(22) PCT Filed: Dec. 12, 2012

(86) PCT No.: PCT/JP2012/082144
§ 371 (c)(1),
(2) Date: Jun. 11, 2014

(87) PCT Pub. No.: WO2013/089118
PCT Pub. Date: Jun. 20, 2013

(65) Prior Publication Data
US 2014/0333068 A1    Nov. 13, 2014

(30) Foreign Application Priority Data

Dec. 13, 2011 (JP) ................. 2011-272014

(51) Int. Cl.
*F16B 2/16*   (2006.01)
*F16L 23/04*  (2006.01)
*F16B 2/10*   (2006.01)

(52) U.S. Cl.
CPC .................. *F16B 2/16* (2013.01); *F16B 2/10* (2013.01); *F16L 23/04* (2013.01)

(58) Field of Classification Search
CPC ................ F16B 2/16; F16B 2/10; F16L 23/04
(Continued)

(56) References Cited

U.S. PATENT DOCUMENTS 1,162,362 A * 11/1915 Hyland ................ F16L 23/06
                                                    285/409
1,603,412 A * 10/1926 Rohde .................. F16L 23/06
                                                    285/409
(Continued)

FOREIGN PATENT DOCUMENTS

FR    1383155 A    11/1963
GB    2 161 535 A    1/1986
(Continued)

OTHER PUBLICATIONS

Supplementary European Search Report dated Jul. 10, 2015, issued in counterpart EP Application No. 12 85 7483. (1 page).
(Continued)

*Primary Examiner* — Anna M Momper
*Assistant Examiner* — Fannie C Kee
(74) *Attorney, Agent, or Firm* — Westerman, Hattori, Daniels & Adrian, LLP

(57) ABSTRACT

A pipe-connecting clamp which is compact, and which can apply a given clamping force through simple operations without using tools. In a clamp (1) for connecting pipes (19) each having a flange (20) at an end thereof, the clamp has first and second clamping members (4, 5) including respective grooves (2) into which a pair of flanges are fitted, a connection member (6) that connects the first and second clamping members in an openable/closable fashion, a roller support member (7) rotatably disposed on the second clamping member, and a roller (8) rotatably supported by the roller support member, wherein the first clamping member (4) has a concave portion (13), and the flanges are pressed and fixed by the first and second clamping members by rotating the roller support member and moving the roller to the concave portion.

10 Claims, 7 Drawing Sheets

(58) Field of Classification Search
USPC ......... 285/409, 420, 82, 364, 406, 252, 365, 285/407, 411
See application file for complete search history.

(56) References Cited

U.S. PATENT DOCUMENTS

| | | | | |
|---|---|---|---|---|
| 1,646,463 | A * | 10/1927 | Stokesberry | F16L 23/06 24/273 |
| 2,775,806 | A * | 1/1957 | Love | F16L 23/06 24/271 |
| 3,045,857 | A | 7/1962 | Lineweber | |
| 3,705,737 | A * | 12/1972 | Westerlund | F16L 23/06 24/271 |
| 3,828,403 | A * | 8/1974 | Perrin | F16L 23/06 24/270 |
| 4,490,891 | A * | 1/1985 | Begley | E21B 41/0007 24/24 |
| 4,492,005 | A * | 1/1985 | Begley | F16L 3/1075 24/24 |
| 4,573,717 | A | 3/1986 | Peacock | |
| 5,988,694 | A * | 11/1999 | Brushaber | F16L 23/06 285/365 |
| 7,210,201 | B2 * | 5/2007 | Maeckle | F16L 23/06 24/270 |
| 7,828,340 | B2 * | 11/2010 | Heelan, Jr. | F16L 21/065 285/366 |
| 2008/0179885 | A1 * | 7/2008 | Ho | F16L 23/06 285/409 |
| 2009/0091125 | A1 * | 4/2009 | Takeda | B25B 27/10 285/88 |

FOREIGN PATENT DOCUMENTS

| | | |
|---|---|---|
| JP | 61-41006 A | 2/1986 |
| JP | 2001-248302 A | 9/2001 |
| JP | 3102808 U | 7/2004 |
| JP | 2005-42740 A | 2/2005 |
| JP | 2010-255701 A | 11/2010 |
| WO | 00/17559 A1 | 3/2000 |

OTHER PUBLICATIONS

International Search Report dated Jan. 22, 2013 issued in corresponding application No. PCT/JP2012/082144.
Notification of Reasons for Refusal dated Nov. 17, 2015, issued in counterpart Japanese Patent Application No. 2011-272014, with English translation. (5 pages).

* cited by examiner

FIG. 4
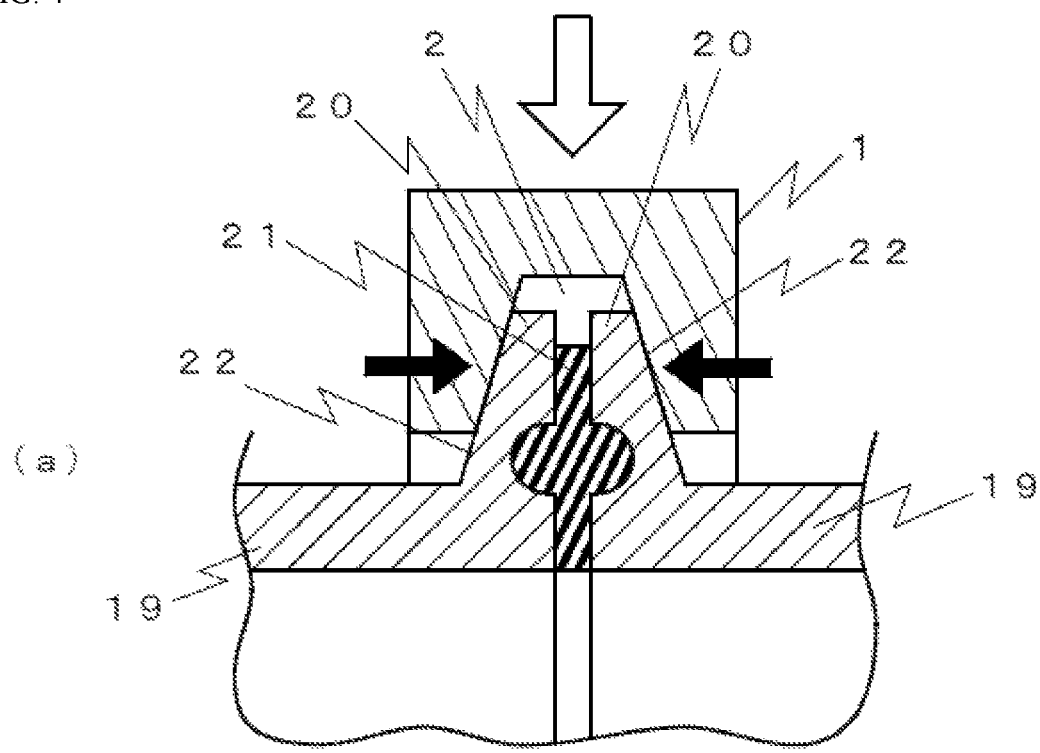
(a)
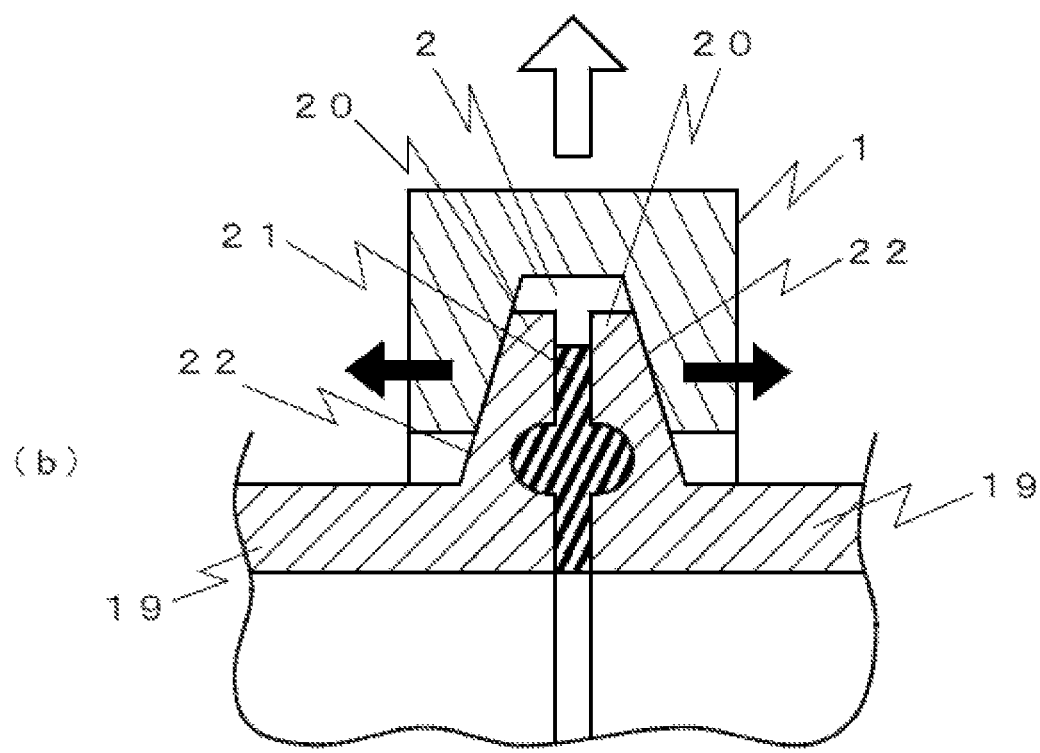
(b)

PIPE-CONNECTING CLAMP

TECHNICAL FIELD

The present invention relates to a pipe-connecting clamp, and more particularly to a clamp for connecting and fixing pipes each having a flange.

BACKGROUND ART

A flange joint using flanges (i.e., disk-shaped larger-diameter portions formed at pipe ends) has hitherto been known as a joint for a location where pipes for feeding a fluid are jointed in a fashion removable as required. Methods for fixing the flanges are mainly grouped into a method of fastening the flanges with bolts, for example, and a method of clamping the flanges with a clamp, for example.

A clamp used in the above-described situation is generally configured as illustrated in FIG. 7. More specifically, respective ends of two clamping members (4, 5), each having a semicircular shape, are rotatably connected to each other through a connection member 6. A fastening member 28 is rotatably disposed at the other end of the lower clamping member 5, and a groove 31 into which the fastening member 28 is fitted is provided at the other end of the upper clamping member 4. A rod portion 29 of the fastening member 28 is threaded, and a butterfly nut 30 is meshed with the threaded rod portion. When fixing the flanges by the above-described clamp, the flanges are fitted into a groove 2 that is formed in inner surfaces of the clamping members, and the fastening member 28 is inserted into the groove 31 of the upper clamping member 4. The butterfly nut 30 is then tightened. As a result, the flanges are fixedly clamped upon application of a force in the direction of the pipe axis to the flanges by the action between the groove 2 formed in the inner surfaces of the clamping members and outer surfaces of the flanges. The above-mentioned general type of clamp has been variously improved (see, e.g., Patent Documents 1 and 2).

Patent Document 1 discloses a pipe-jointing clamp comprising a clamp body including a plurality of substantially arc-shaped clamp pieces, respective ends of the clamp pieces being pivotally connected to each other at a portion except for at least one location in each clamp piece, and a first screw member and a second screw member meshed with each other to fasten the not-pivotally-connected ends of the clamp pieces of the clamp body together, wherein a groove into which tapered flanges formed in short pipe members are fitted is circumferentially formed in an inner peripheral surface of each clamp piece, the first screw member is rotatably attached to one of the not-pivotally-connected ends of the clamp pieces, and a hole engageable with a ratchet tool is formed in the second screw member that pushes the other of the not-pivotally-connected ends of the clamp pieces in the axial direction of the first screw member.

Patent Document 2 discloses a pipe clamping joint used, when ferrules of pipes at a seam therebetween are abutted against each other with a gasket fitted into annular grooves recessed in contact surfaces of the ferrules, for preventing leakage of powdery materials, liquids, or gas flowing through pipes to the outside by being tightly fitted over outer peripheries of the abutted portions of the ferrules, wherein lower ends of a pair of clamp hands divided into halves each having a substantially semicircular shape and each having a groove capable of covering the outer peripheries of the abutted portions of the ferrules are rotatably connected to each other through a connection metal fixture, free end portions of the pair of clamp hands are bent upward in a state capable of being kept parallel to each other, thereby forming a pair of fastening portions that has a substantially C-shape when viewed from above, a link plate is rotatably attached to opposite lateral sides of one of the paired fastening portion through pins, an operating lever including a cam portion formed in a proximal end portion thereof is rotatably attached to distal end portions of the pair of link plates through pins, and a cam receiving recess against which the cam portion formed in the proximal end portion of the operating lever is pressed is recessed in the other fastening portion.

LIST OF PRIOR-ART DOCUMENTS

Patent Documents

Patent Document 1: Japanese Utility Model Registration No. 3102808
Patent Document 2: Japanese Patent Laid-Open Publication No. 2010-255701

SUMMARY OF THE INVENTION

Problems to be Solved by the Invention

The pipe-jointing clamp of Patent Document 1 requires a dedicated tool when fastening or unfastening the clamp, and takes a certain working time to rotate the tool through a predetermined number of times. Furthermore, because the degree of fastening is manually adjusted, there is a risk causing breakage or deformation (plastic deformation) due to excessive fastening, or leakage due to deficient fastening.

Patent Document 2 accompanies with a possibility that because the handle is protruded long and is obstructive, workers are caught by the handle in some cases.

Furthermore, the clamp disclosed in each of the above-cited Patent Documents needs a space allowing the handle or the tool to be moved for operation. Thus, a comparatively wide space has to be taken around a location where the disclosed clamp is attached.

In view of the above-described problems in the art, an object of the present invention is to provide a pipe-connecting clamp that is compact, and that can apply a given clamping force through simple operations without using tools.

Means for Solving the Problems

According to a first invention, there is provided a pipe-connecting clamp for connecting pipes each having a flange at an end thereof, the clamp comprising first and second clamping members including respective grooves into which a pair of flanges are fitted, a connection member that connects first and second clamping members in an openable/closable fashion, a roller support member rotatably disposed on second clamping member, and a roller rotatably supported by roller support member, wherein first clamping member has a concave portion, and flanges are pressed and fixed by first and second clamping members by rotating roller support member and moving roller to the recess.

According to a second invention, in the first invention, the first clamping member includes a slope that is provided in continuation with the concave portion, and that guides the roller to the concave portion.

According to a third invention, in the second invention, a crest is present at a boundary between the concave portion and the slope.

According to a fourth invention, in the third invention, the first clamping member includes a lock portion defined by a substantially S-shaped upper surface.

According to a fifth invention, in the second invention, anti-slipping treatment is carried out on the slope and a surface of the roller.

According to a sixth invention, in the first invention, a most surface of the concave portion, including a bottom thereof, is a smooth surface.

According to a seventh invention, in the first invention, treatment for reducing friction resistance is carried out on the most surface of the concave portion, including the bottom thereof.

According to an eighth invention, the pipe-connecting clamp according to the first invention further comprises a mechanism that enhances a pressing force applied by the roller.

According to a ninth invention, in the first invention, the roller includes an operating member having a larger diameter than the roller.

Advantageous Effects of the Invention

With the present invention, the clamp can be attached and detached by an operation of just rolling the roller, the operation is easy to perform and the clamp can be attached and detached in a shorter time.

Moreover, since a large-sized operating part, such as a handle, is not used, the clamp is compact and a space necessary for the attaching and detaching operations is small.

BRIEF DESCRIPTION OF THE DRAWINGS

FIG. 2(a) represents a state where a roller comes into contact with a beak portion, FIG. 2(b) represents a state where the roller reaches a crest, and FIG. 2(c) represents a state where the roller is engaged in a concave portion.

FIG. 3(a) represents a state where the roller is moved to a surface-treated region, FIG. 3(b) represents a state where the roller is moved up to the crest, and FIG. 3(c) represents a state where the roller is detached from the beak portion.

FIG. 4 is a partially enlarged sectional view illustrating the relationship between flanges and the clamp; specifically, FIG. 4(a) represents a state where the clamp is pushed down, and FIG. 4(b) represents a state where the clamp is lifted up.

MODE FOR CARRYING OUT THE INVENTION

In a clamp according to the present invention, first and second clamping members including grooves into which a pair of flanges are fitted are fixed by employing a roller. Embodiments in practicing the present invention will be described below.

First Embodiment (1) Structure

Figure 1:
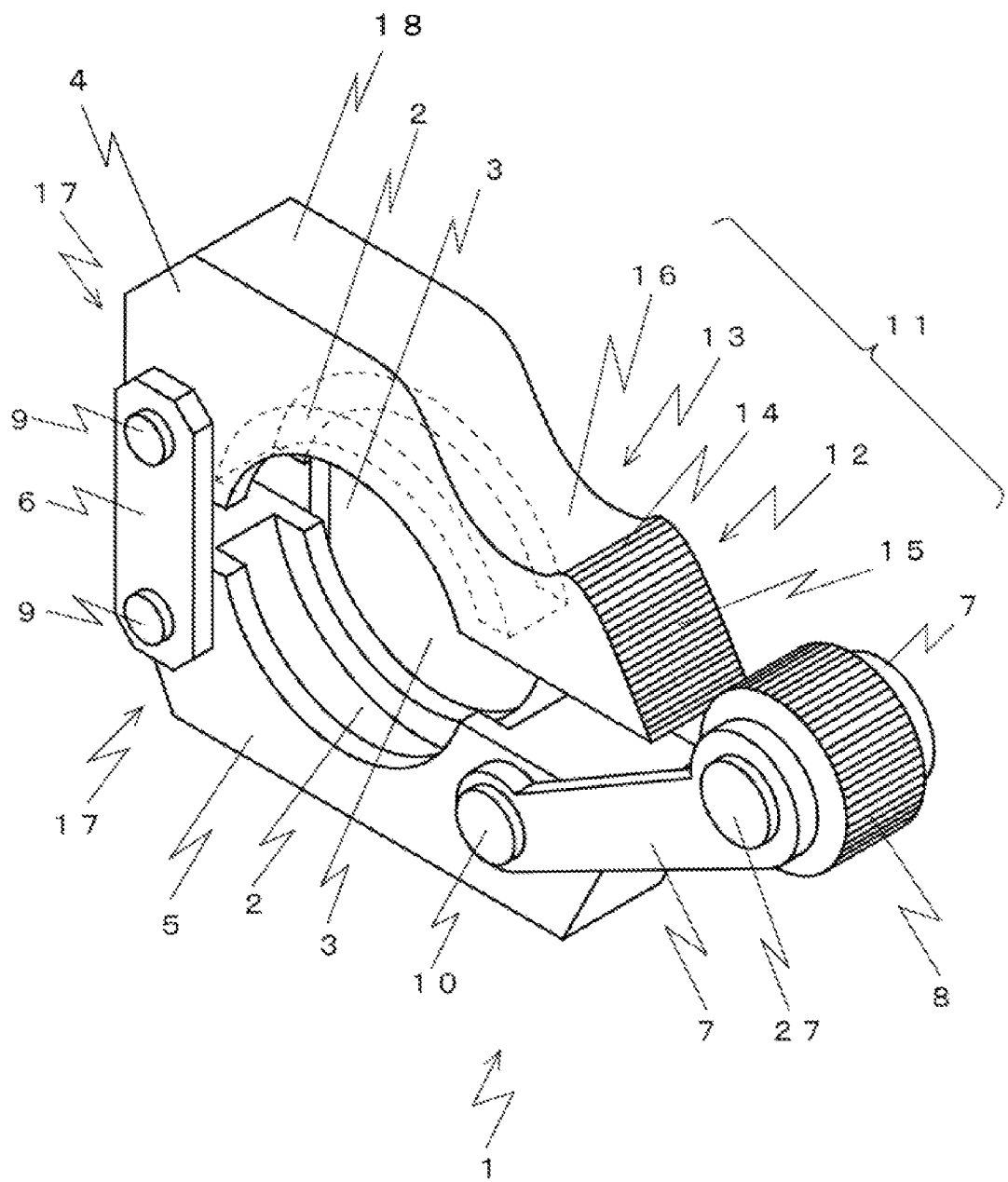
FIG. 1 is a perspective view illustrating a clamp according to a first embodiment.

The structure of a clamp according to a first embodiment is described with reference to FIG. 1.

A clamp 1 of this embodiment includes a pair of clamping members 4 and 5, a connection member 6 that rotatably connects the clamping members 4 and 5 at respective ends 17, a pair of roller support members 7 rotatably disposed at the other end of the lower clamping member 5 away from the connected end 17, and a roller 8 rotatably disposed in a state sandwiched between the pair of roller support members 7. It is to be noted that the clamping member denoted by reference numeral 4 is called the upper clamping member and the clamping member denoted by reference numeral 5 is called the lower clamping member in the following for convenience of explanation, those two clamping members may not be positioned in vertically spaced relation in practical layout.

Each of the clamping members 4 and 5 includes a cutout 3 having a semicircular shape in conformity with a pipe shape, and a semicircular groove 2 into which a flange 20 is fitted is formed in the cutout 3. A beak-shaped lock portion 11 is formed at the other end of the upper clamping member 4 away from the connected end 17 (i.e., at an end of the upper clamping member 4 facing an end of the lower clamping member 5 where the roller 8 is disposed). In more detail, the lock portion 11 has a substantially S-shaped upper surface such that a convex portion 12 and a concave portion 13 are formed to define a continuously curve extending from a distal end of the lock portion 11 toward the connected end 17.

The convex portion 12 has not only a role of guiding the roller 8 to a crest 14 along a convex slope 15, thus strongly pressing the clamping members 4 and 5, but also a role of a stopper to keep the roller 8 positioned in the concave portion 13 from coming out of the concave portion 13. To that end, the crest 14 is formed such that the height of the crest 14 is higher than a lower end of the roller 8 (i.e., a bottom of a radius path along which the roller is movable) in a state where the flanges 20 are sandwiched between the upper and lower clamping members (4, 5) (i.e., in a state before the clamping members 4 and 5 are fixed by employing the roller 8). Furthermore, anti-sliding surface treatment is preferably carried out on the slope 15 spanning from the distal end of the lock portion 11 to the crest 14. Such surface treatment may be carried out beyond the crest 14 until covering a certain boundary region between the concave portion 13 and the crest 14.

In this embodiment, anti-slipping surface treatment is further carried out on a barrel surface of the roller 8 corresponding to the surface treatment of the slope 15. The anti-slipping surface treatment may be practiced, for example, by forming teeth of mutually meshing gears, by forming fine irregularities on the surface with mechanical machining such as knurling or sand blasting, or by coating a material having non-slippery properties, such as rubber or resin. With such surface treatment, the roller 8 is made easier to roll over the surface of the convex portion 12 of the lock portion, and hence the roller 8 can be readily operated by a small force.

The concave portion 13 is a recess where the roller 8 is positioned when the flanges 20 are in a state of being fixedly held by the upper and lower clamping members (4, 5). Therefore, the surface of the concave portion 13 preferably has a curved shape that increases a contact area with respect to a circumferential surface of the roller 8. The depth of the concave portion 13 is designed such that, when the flanges having corresponding standards are clamped, the height from a bottom of the lower clamping member 5 to a bottom 16 of the concave portion has a proper value. By properly setting the depth of the concave portion 13, the roller 8 can be stably held by a locking action of the concave portion 13. Furthermore, a force acting to tighten a gasket 21 can be always kept constant.

In this embodiment, the anti-slipping surface treatment is not carried out on the concave portion 13. Preferably, an entire surface of the concave portion 13 or a surface thereof including the bottom is formed as a smooth surface (i.e., a surface having small friction resistance). Moreover, surface treatment, e.g., mirror finishing or coating of lubricant resin, may be carried out on the above-mentioned surface to further reduce the friction resistance. The reason is that, with such surface treatment, even when the roller 8 is falsely touched by a worker in a fastened state of the clamp 1, the roller 8 is caused to idle in the concave portion 13 unless a large force is applied to the roller 8, and the roller 8 is hard to move in the direction in which the clamp 1 is unfastened.

The roller 8 is rotatably supported by a roller shaft 27 that connects the roller support members 7 to each other. The roller 8 is reciprocally movable between a fixing position (i.e., a position of the concave portion 13) where the roller 8 fixedly holds the clamping members (4, 5), and an open position (see FIG. 1 and FIG. 3(c)) where the roller 8 is not contacted with the upper clamping member 4. In other words, the roller support members 7 are able to swing like a pendulum about an axis defined by a pin 10 that is pivotally mounted to the lower clamping member 5.

(2) Fastening Operation

Figure 2:
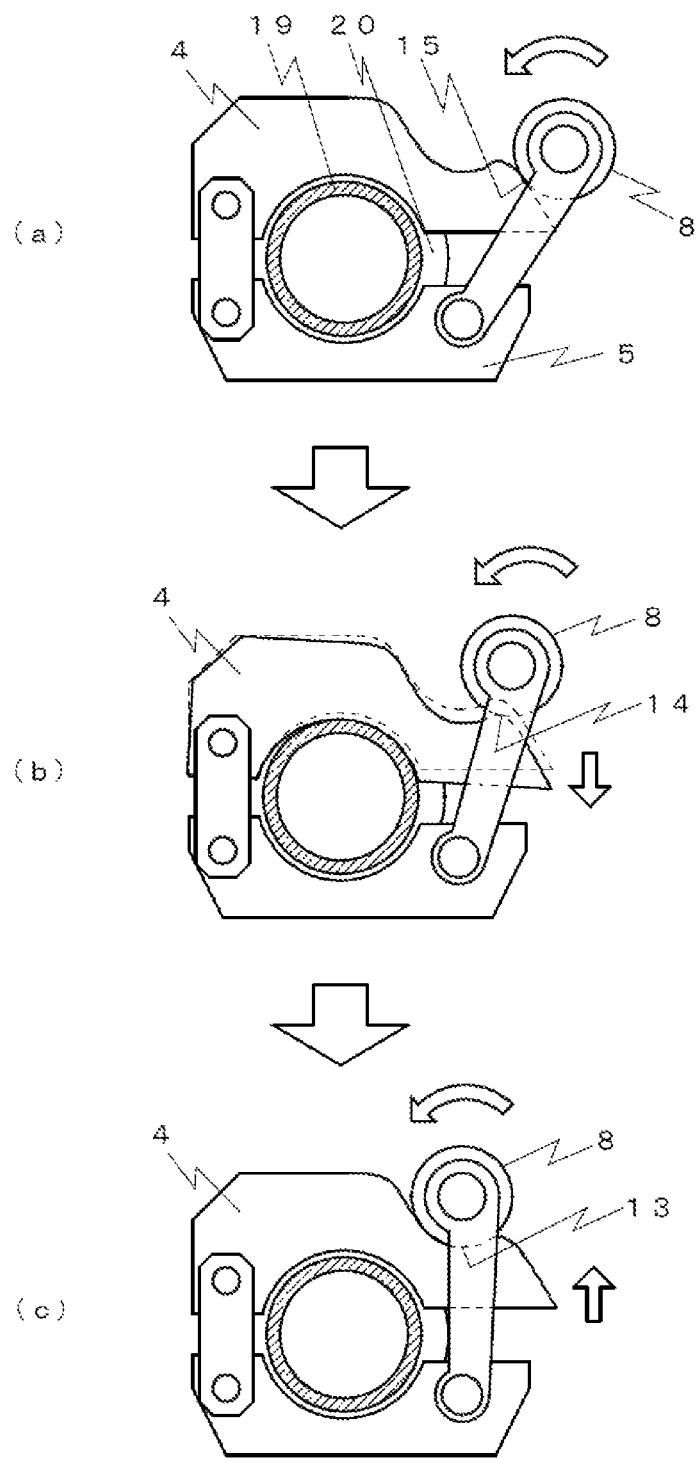
FIG. 2 is a side view illustrating successive states when the clamp according to the first embodiment is fastened; specifically.

Clamp operating procedures when pipes 19 and 19 having the flanges 20 at respective ends are connected to each other by employing the clamp 1 of this embodiment will be described below with reference to FIG. 2.

First, the flanges 20 at the pipe ends are positioned to face each other and are held together with the gasket 21 interposed between the flanges 20. Thereafter, the flanges 20 are fitted into the groove 2 of the clamp and are sandwiched between the upper and lower clamping members (4, 5).

Then, the roller 8 is moved toward the upper clamping member 4 and is contacted with the slope 15 of the convex portion (FIG. 2(a)).

Then, the roller 8 is rolled over the slope 15 and is moved up to the crest 14 of the upper clamping member 4 (FIG. 2(b)). At that time, the upper clamping member 4 is pushed downward upon pressing by the roller 8. Such a push-down operation is based on the fact that the flanges 20 have respective tapered surfaces 22 and the gasket 21 having elasticity is interposed between the flanges 20. In other words, a total width of the flanges 20 is reduced with collapse of the gasket 21, and the flanges 20 are allowed to enter a deeper portion of the groove 2 having a trapezoidal shape in section (see FIG. 4(a)).

The roller 8 is then positioned in the concave portion 13 of the upper clamping member 4 (FIG. 2(c)). At that time, the upper clamping member 4 is slightly raised (spaced from the lower clamping member 5). This is because, due to the fact that the flanges 20 have the respective tapered surfaces 22 and the gasket 21 having elasticity is interposed between the flanges 20, the total width of the flanges 20 is increased with the gasket 21 restoring to an original shape due to the elasticity, and the flanges 20 are pushed back to a shallower portion of the groove 2 (see FIG. 4(b)).

Since, as described above, fastening work using the clamp 1 of this embodiment just needs an operation of rolling the roller 8 to ride over the convex portion 12, the operation is easy to perform. Furthermore, since the anti-slipping surface treatment is carried out on the roller 8 and the slope 15 over which the roller 8 rolls, the operation can be performed by a small force. Moreover, since a handle, a tool, or any other appliance is not used in the operation, a space necessary for the operation is small.

(3) Disassembling Operation

Figure 3:
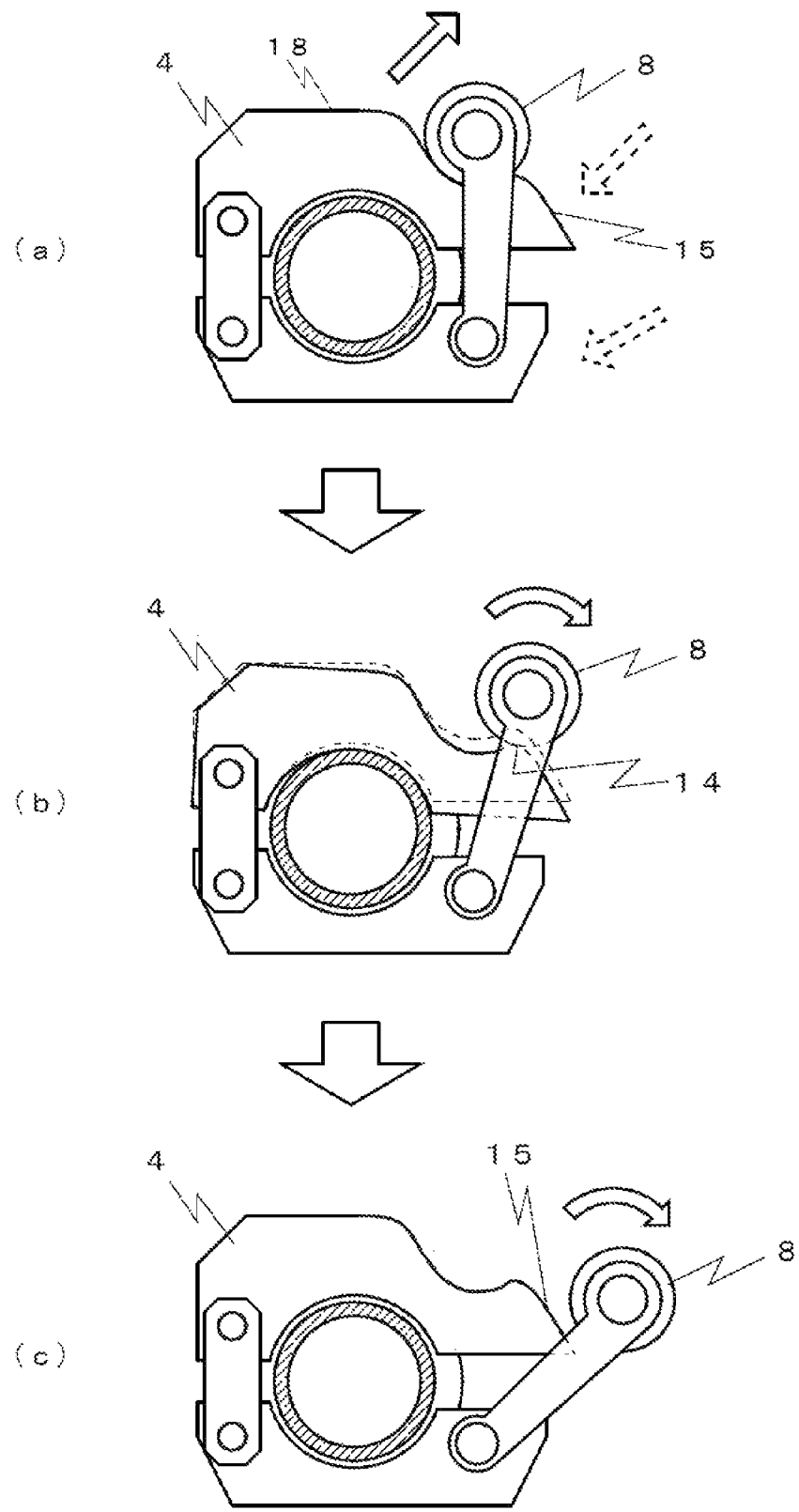
FIG. 3 is a side view illustrating successive states when the clamp according to the first embodiment is unfastened; specifically.

Clamp operating procedures when pipes 19 and 19 connected to each other by the clamp 1 of this embodiment are disassembled will be described below with reference to FIG. 3.

When unfastening the clamp 1, a force acting in an oblique upward direction is first applied to the roller 8, thus moving the roller 8 to the boundary between the concave portion 13 and the crest 14 of the upper clamping member 4 (FIG. 3(a)). At that time, the operation can be easily performed by concurrently pressing (forcing) the upper clamping member 4 or the lower clamping member 5 to displace in a direction away from the roller 8.

Then, the roller 8 is rolled and moved up to the crest 14 of the upper clamping member 4 (FIG. 3(b)). At that time, the upper clamping member 4 is pushed downward upon pressing by the roller 8 (see the above description of FIG. 2(b) and FIG. 4(a)).

Then, the roller 8 is rolled over the convex slope 15 of the upper clamping member 4 and is removed from the upper clamping member 4 (FIG. 3(c)).

Finally, the clamping members (4, 5) are opened and the clamp 1 is removed from the flanges 20. Thus, the pipes 19 and 19 can be disassembled.

Since, as described above, disassembling work in the casing using the clamp 1 of this embodiment just needs an operation of rolling the roller 8 to ride over the convex portion 12, the operation is easy to perform. Furthermore, since a handle, a tool, or any other appliance is not used in the operation, a space necessary for the operation is small.

According to this embodiment, as discussed above, the clamp can be attached and detached in a short time with easy operation. In addition, since there is no protruding portion like a handle, unintended operation can be prevented while a compact clamp is realized.

Second Embodiment

A second embodiment relates to a pipe-connecting clamp suitable for the case where an extent of collapse of the gasket 21 is small and a repulsive force from the flanges 20 is weak, or the case where pressure of a fluid fed through the pipes 19 is high and the flanges 20 are to be held more firmly. This embodiment includes a mechanism acting to always compress the roller support members 7 (i.e., a pressing-force enhancement mechanism).

Figure 5:
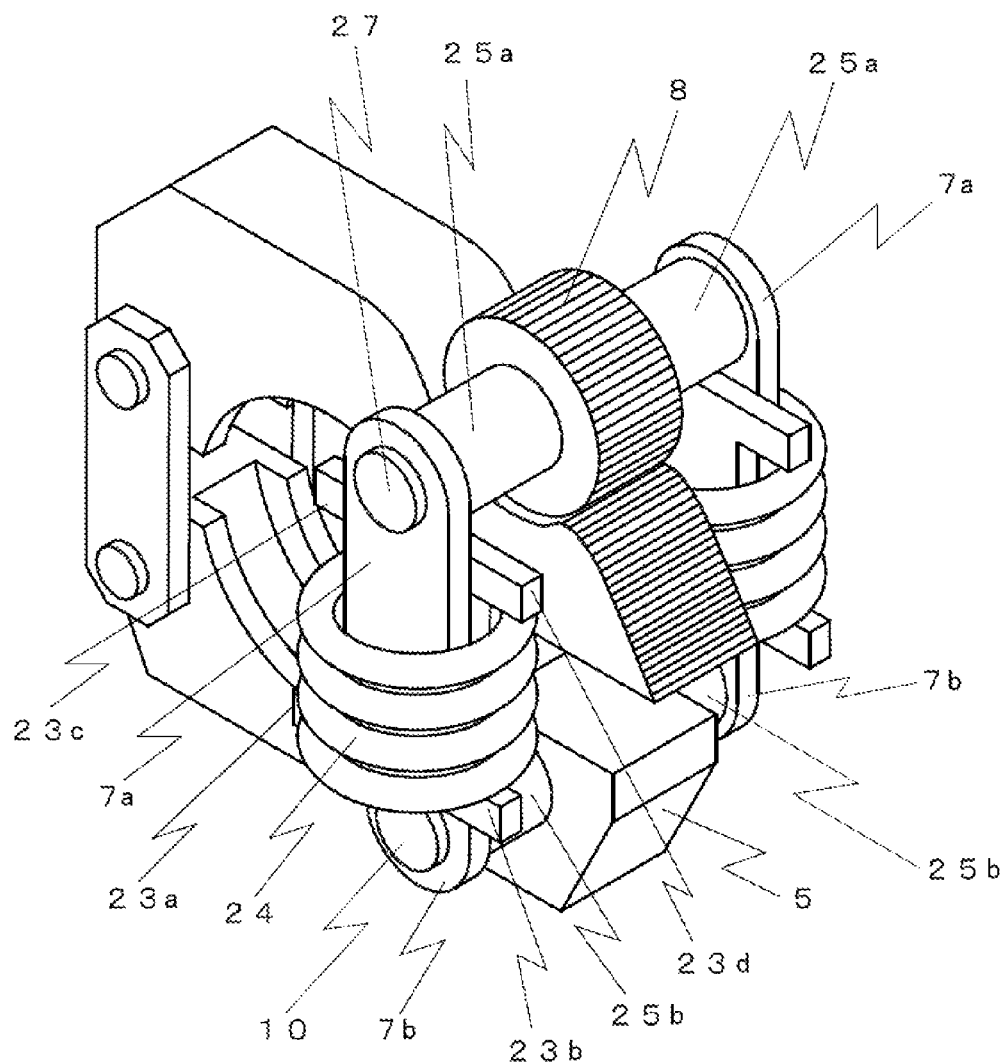
FIG. 5 is a perspective view illustrating a clamp according to a second embodiment, the clamp including springs.

The structure of a clamp according to the second embodiment will be described below with reference to FIG. 5, but description of components common to those in the first embodiment is omitted.

In this embodiment, the roller support members are each divided into two members (7a, 7b). The member 7a includes at an end thereof a pair of projected portions 23a and 23b extending in opposed directions, and the member 7b includes at end thereof a pair of projected portions 23c and 23d extending in opposed directions. Thus, the end of each of the members 7a and 7b has a T-like shape. A pair of compression springs 24 are each disposed in a state sandwiched between upper and lower ones of the four projected portions 23a to 23d. Cylindrical spacers 25a and 25b are fitted respectively over the roller shaft 27, which connects the roller support members 7a and 7b, and the pin 10. In more detail, two spacers 25a are fitted between the pair of roller support members 7a and the roller 8, and two spacers 25b are fitted between the pair of roller support members 7b and the lower clamping member 5. The roller support member 7a including the projected portions 23a and 23b is connected to the roller 8, and the roller support member 7b including the projected portions 23c and 23d is connected to the lower clamping member 5. Because the compression spring 24 is held in a state not contacting the upper and lower clamping members (4, 5) with the provision of the spacers 25a and 25b, a force acting to attract the roller 8 toward the lower clamping member 5 can be generated by the extending action of the compression spring 24. Thus, the compression spring 24 always applies a force in a direction fastening the clamp 1 against a force acting to disconnect the flanges 20. As a result, the flanges 20 can be held more firmly.

Third Embodiment

Figure 6:
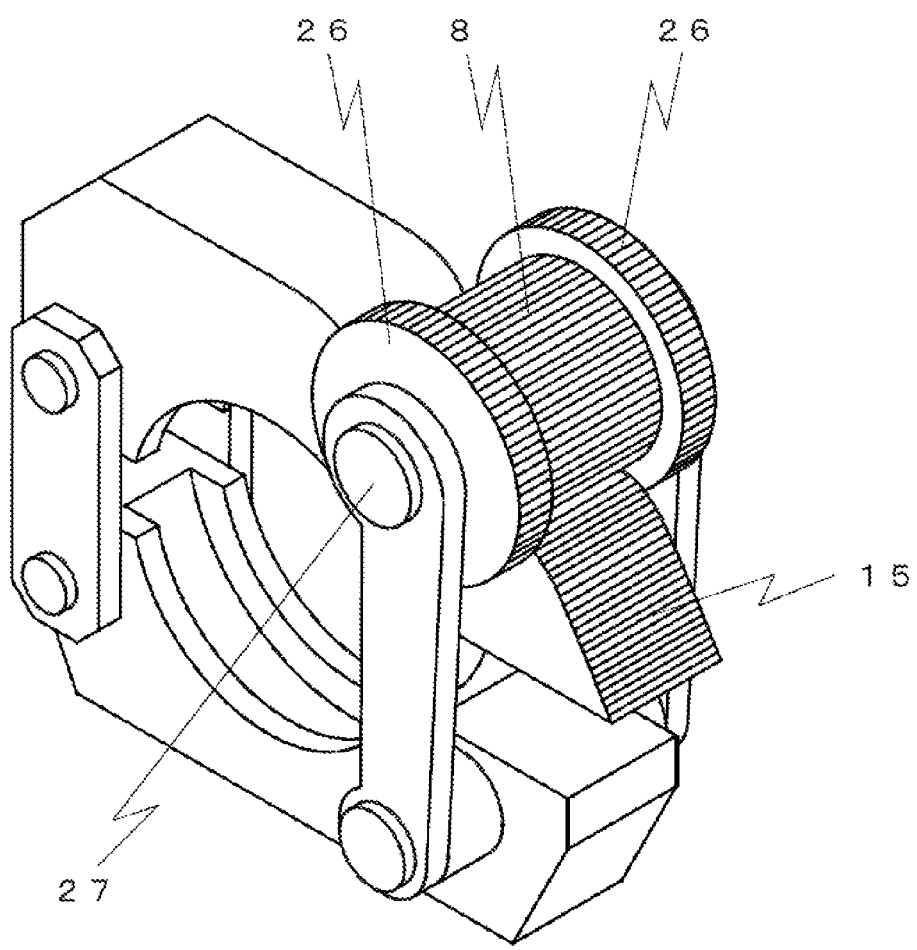
FIG. 6 is a perspective view illustrating a clamp according to a third embodiment, the clamp including rollers each having a different diameter from that of the above-mentioned roller.
Figure 7:
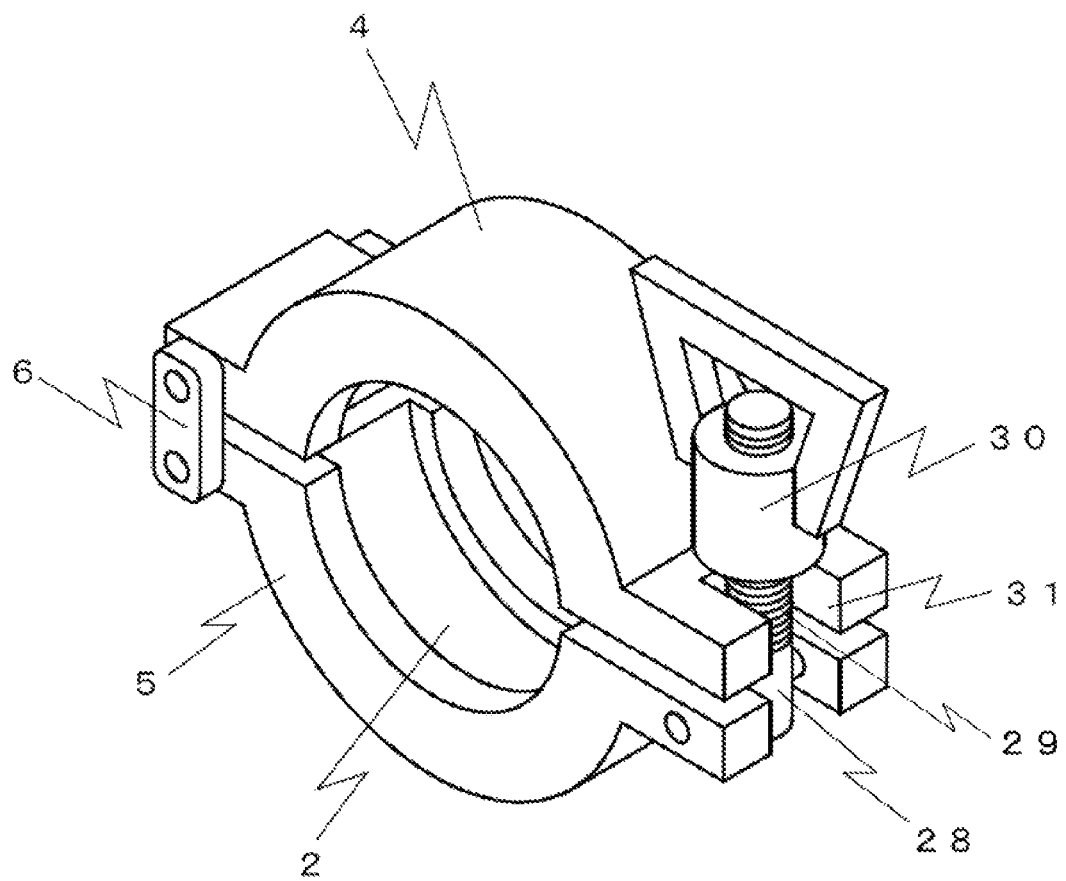
FIG. 7 is a perspective view illustrating a clamp of prior art.

In a clamp 1 of a third embodiment, operating rollers 26 each having a larger diameter than the roller 8 are disposed on the outer side of the roller 8 in order that the roller 8 can be operated by a smaller force. The structure of the clamp according to the third embodiment will be described below with reference to FIG. 6, but description of components common to those in the first embodiment is omitted.

This embodiment includes disk-shaped operating members (operating rollers) 26, which are fixedly disposed on both sides of the roller 8 coming into contact with the slope 15, and which are rotated together with the roller 8. The roller 8 is formed in width wider than that of the upper clamping member 4 such that the operating rollers 26 will not contact the lock portion 11. As another example, a spacer may be fitted between the roller 8 and each of the operating rollers 26.

According to this embodiment, since the operating rollers 26 each have the larger diameter than the roller 8, the clamp can be operated by a smaller force than the case of rotating the roller 8. More specifically, the roller shaft 27 serves as a fulcrum, a contact point between the roller 8 and the lock portion 11 serves as the point of load, and a contact point between the roller 8 and an operating hand serves as the point of effort. Thus, since the distance between the fulcrum and the point of effort is greater than the distance between the fulcrum and the point of load, the operating force can be reduced in accordance with the principle of leverage.

LIST OF REFERENCE SYMBOLS

1: clamp 2: groove (flange fitted groove) 3: cutout 4: upper clamping member 5: lower clamping member 6: connection member 7: roller support member 8: roller 9: pin (connection member) 10: pin (roller swing axis) 11: lock portion 12: convex portion 13: concave portion 14: crest 15: slope of convex portion 16: bottom of concave portion 17: connected end 18: upper surface 19: pipe 20: flange 21: gasket 22: tapered surface 23: projected portion 24: compression spring 25: spacer 26: operating member (operating roller) 27: roller shaft 28: fastening member 29: rod portion 30: butterfly nut 31: groove (into which fastening member is fitted)

The invention claimed is:

1. A pipe-connecting clamp for connecting pipes each having a flange at an end thereof, the clamp comprising:
   first and second clamping members including respective grooves into which a pair of flanges are fitted;
   a connection member that connects the first and second clamping members in an openable/closable fashion;
   a roller support member rotatably disposed on the second clamping member; and
   a roller rotatably supported by the roller support member,
   wherein the first clamping member has a concave portion, and the flanges are pressed and fixed by the first and second clamping members by rotating the roller support member and moving the roller to the concave portion,
   the first clamping member includes a slope that is provided in continuation with the concave portion to guide the roller such that the roller rolls over the slope onto the concave portion, and
   the concave portion is provided between an upper surface of the first clamping member and the slope.

2. The pipe-connecting clamp according to claim 1, wherein a crest is present at a boundary between the concave portion and the slope.

3. The pipe-connecting clamp according to claim 2, wherein the first clamping member includes a lock portion defined by a substantially S-shaped upper surface.

4. The pipe-connecting clamp according to claim 1, wherein anti-slipping treatment is carried out on the slope and a surface of the roller.

5. The pipe-connecting clamp according to claim 4, wherein treatment for reducing friction resistance is carried out on a surface of the concave portion, including a bottom thereof.

6. The pipe-connecting clamp according to claim 1, wherein a surface of the concave portion, including a bottom thereof, is a smooth surface.

7. The pipe-connecting clamp according to claim 1, further comprising a mechanism that enhances a pressing force applied by the roller.

8. The pipe-connecting clamp according to claim 1, wherein the roller includes an operating member having a larger diameter than the roller.

9. The pipe-connecting clamp according to claim 1, wherein the roller support member is capable of swinging like a pendulum around an axis defined by a roller swing axis member that is pivotally mounted to the second clamping member.

10. The pipe-connecting clamp according to claim 1, wherein the roller has an annular shape.

* * * * *